(12) United States Patent
Anderson et al.

(10) Patent No.: US 7,257,257 B2
(45) Date of Patent: *Aug. 14, 2007

(54) METHOD AND APPARATUS FOR DIFFERENTIAL, BANDWIDTH-EFFICIENT AND STORAGE-EFFICIENT BACKUPS

(75) Inventors: Andrew V. Anderson, Hillsboro, OR (US); Steven M. Bennett, Hillsboro, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 840 days.

This patent is subject to a terminal disclaimer.

(21) Appl. No.: 10/644,445

(22) Filed: Aug. 19, 2003

(65) Prior Publication Data

US 2005/0114614 A1    May 26, 2005

(51) Int. Cl.
*G06K 9/00* (2006.01)
(52) U.S. Cl. .............. 382/187; 709/212; 709/231; 709/247; 711/161; 711/162
(58) Field of Classification Search .......... 382/187, 382/174, 177, 203, 289; 709/217–219, 229–232, 709/211–212, 247; 711/161–162; 216/24, 216/33, 41, 52; 725/135, 138, 32, 90; 715/758
See application file for complete search history.

(56) References Cited

U.S. PATENT DOCUMENTS 7,139,808 B2 *  11/2006  Anderson et al. .......... 709/212

OTHER PUBLICATIONS

Sean Quinlan and Sean Dorward, "Venti: A New Approach to Archival Storage," Proceedings of the FAST '02 Conference on File & Storage Technologies, USENIX2003ISBN 1-880446-03-0 2002 pp. 89-101 Monterey California Jan. 2002.

* cited by examiner

*Primary Examiner*—Sheela Chawan
(74) *Attorney, Agent, or Firm*—Blakely, Sokoloff, Taylor & Zafman LLP

(57) ABSTRACT

A process is introduced that determines contour requirements from many factors. Based on the contour requirements, the process either generates at least one content-derived signature contour from either many content identifiers or at least one content-derived signature contour, or generates at least one optimized content-derived signature contour from contour-related data and either at least one content-derived signature contour or a derivation from at least one content-derived signature contour.

31 Claims, 9 Drawing Sheets

| Client-Specific Article Descriptor |
|---|
| |
| Content Identifier<br>Client Identifier<br>File name<br>Directory name<br>File size<br>Timestamps (created, modified, accessed, archived)<br>Permissions<br>User id<br>Group id<br>File type<br>etc. |

| Client-Invariant Content Descriptor |
|---|
| |
| Content Identifier<br>File contents<br>Common-Shared Metadata (file pathname, permissions, file size, etc) |

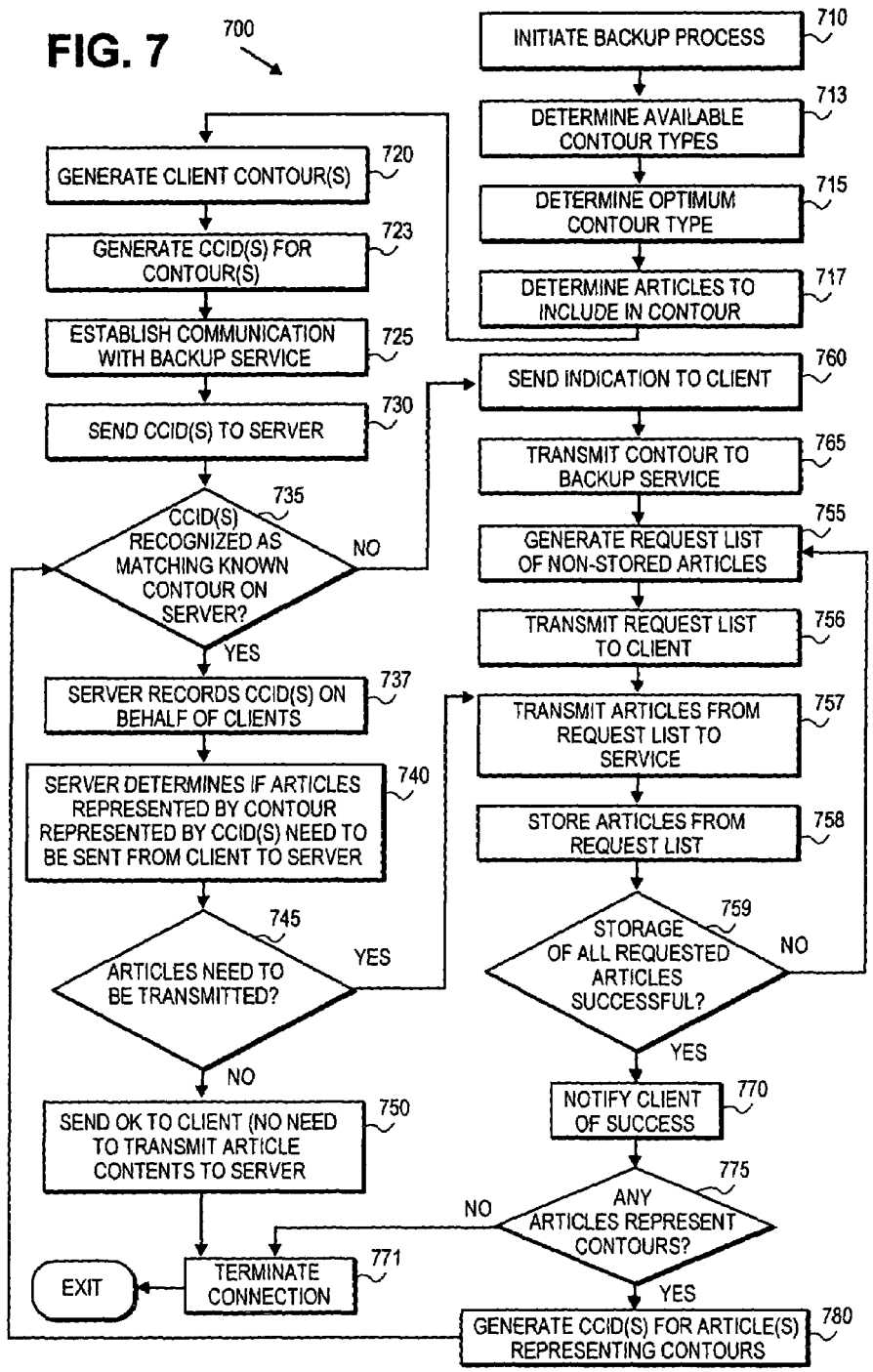

METHOD AND APPARATUS FOR DIFFERENTIAL, BANDWIDTH-EFFICIENT AND STORAGE-EFFICIENT BACKUPS

BACKGROUND

1. Field

The embodiments relate to computer system backup, and more particularly to a method and apparatus for providing differential bandwidth-efficient and storage-efficient backups and restoration.

2. Description of the Related Art

As computer systems, such as personal computers (PCs), servers, personal digital assistants (PDAs), cellular telephones, etc. assume a more centralized role as the life repository of schedules, documents, digital photos, movies and recordings, etc., the exposure to loss of system functionality and use becomes increasingly great. This is because the information lost may truly be information that cannot be recreated, regardless of the cost or effort. Backing up and restoring data on computer systems can be problematic for many computer users. Even though users have their mission-critical personal or business data on their computer systems, which may have required hundreds or even thousands of hours to create, many users do not take appropriate steps to guarantee that their data is preserved in case of a catastrophic event. Such catastrophic events can include system failures, hard drive failures, fire, or other disasters.

If a user of a computer system believes that they cannot reliably store, and thus recover valuable information, these users may be unwilling to use the computer system as a repository for important information. Therefore, data protection security may prove to be a formidable barrier to digital technology adoption. Other problems that a user may have with backing up data are the time it takes to complete a backup, the reliability of the backup destination, and the ease of use of a backup system.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 2 illustrates a Client-Specific Article Descriptor (CSAD) as utilized by one embodiment.

FIG. 3 illustrates a Client-Invariant Content Descriptor (CICD) as utilized by one embodiment.

FIG. 7 illustrates a block diagram of an embodiment having a backup process.

DETAILED DESCRIPTION

Figure 1:
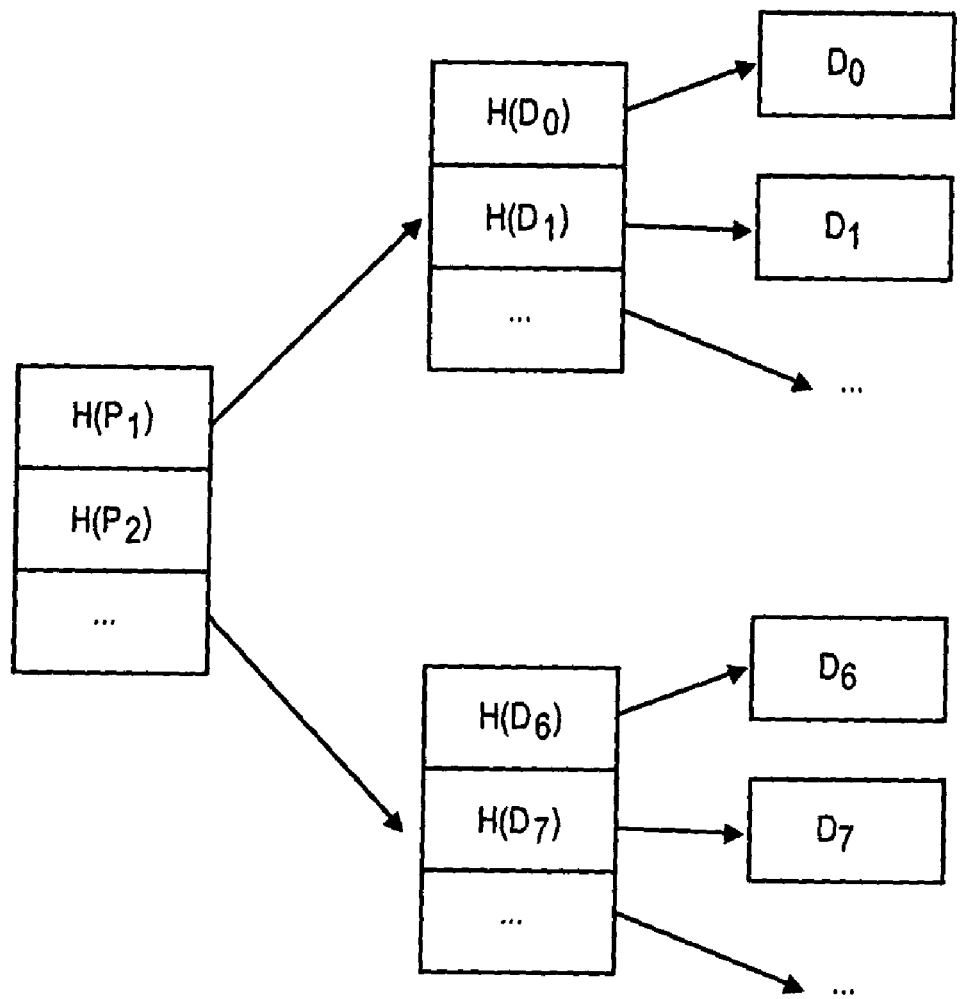
FIG. 1 illustrates a hash tree.

The Embodiments discussed herein generally relate to a method and apparatus for differential bandwidth-efficient and storage-efficient backup and restoration. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

For the sake of clarity in describing embodiments, the terms 'client' and 'server' are used as follows. The term 'client' herein describes a logical device that uses a backup/restore service. The term 'server' herein is used to represent a logical device that provides a backup/restore service. A logical device may contain one or more computing systems, such as desktop personal computers (PCs), workstations, file servers, personal digital assistants (PDAs), digital cameras, cellular telephones, or other devices containing a processing unit (network routers, set-top boxes, etc.). Note that it is possible for a logical device to contain multiple physical devices, or for a single physical device to contain multiple logical devices. One example of this would be a single physical device, such as a computer, running multiple virtual or simulated machines.

Also for the sake of clarity in describing embodiments, the term 'article' is used herein. The term 'article' comprises objects to be stored or manipulated, including: available storage locations (e.g., directories), user data (e.g., text, photos, music, movies, etc.), applications (e.g., word processors, spread sheets, web browsers, etc.), operating system executables, command scripts, byte codes, configuration data, manifests, registries, libraries, drivers, documentation, Web pages, etc. Articles can include objects based on structural partitioning, such as physical file blocks; that is, fixed or variable-sized sequences of (bits or) bytes, called blocks, that are stored on physical media such as hard disks. Indeed, articles have a recursive definition in that articles can be composed of other articles.

Articles can reside on a computer system device in a number of storage locations comprising non-volatile memory, volatile memory, hard disks, holographic storage, delay lines, etc. Articles often have associated metadata, which may be either explicitly or implicitly defined. For example, articles stored on a hard disk typically have an explicitly associated directory path name, access permission lists, etc. Other articles, for example, can have implicitly associated metadata, such as the code and data stored in flash memory in many devices (e.g., basic input/output system (BIOS) in a personal computer). These latter articles can be uniquely identified and assigned permissions, etc., in an analogous manner. Note that there is also metadata that is not associated with one or more articles either explicitly or implicitly. Examples of this article-nonspecific metadata include the date and time a backup was started, the version of the operating system, the storage capacity of a device, etc.

In some articles, metadata is sometimes implicitly represented, such as order information in a list. Without this information to guide access, manipulation, and interpretation, the data may not make sense. Such implicitly represented metadata is well understood by those skilled in the art. Metadata can also include file system information, information for translating between name spaces, information comprising pathnames to alternative systems, etc. The term "metadata" herein may refer to any type of metadata.

Given the existence of a large pool of computer system clients, a great deal of redundancy exists in terms of articles. Some of the groups of redundant articles are, for example, core operating system articles, application articles, documentation and commercial media articles. A great deal of redundancy typically exists between the contents of a machine at a given time and the contents of the same machine at a later time. Redundancy may also exist within the contents of a machine at a single point in time. The various embodiments to be discussed detect and leverage such redundancy in order to make the transfer, processing (i.e., manipulation), and storage of articles more efficient. For example, enabling multiple articles with identical contents to share a single stored copy of those contents.

A "contour," herein, comprises a snapshot of the state of every article within a designated collection of articles and supplementary annotations or metadata at a given time. A contour can be constructed for a given collection of articles on the client's system and can comprise every article on the client device or a proper subset of articles on the client device. The state of a given article comprises a representation of article contents and possibly other client-specific article metadata. A contour may comprise additional supplementary annotations or metadata, such as a unique name or identifier for the contour, the date and time the contour was created, integrity signatures (e.g., checksums), etc. Contours of the same collection of articles, but created at different times, can be used to capture the evolution of the articles in the collection and the relationships between articles over time. In one embodiment, a contour may be constructed for a collection of zero or more articles.

For clarity of presentation, and not by way of limitation, a limited number of examples are shown for illustration with respect to what information is contained within a contour and where that information is stored or organized, etc. For example, the above definition of a contour includes monolithic, centralized representations and distributed representations. Centralized representations include tape archive formats, such as those produced by the UNIX® Operating System (OS) TAR (tape archive) command (The Single UNIX Specification, V2 (UNIX 98), February 1997). In this representation, article contents and associated article names and access permissions are stored in the contour. Distributed representations include UNIX® OS RCS (Revision Control System), in which articles are stored such that contour name, contour date and time, article name, user annotations about the article evolution, and article contents are stored in separate objects (The Single UNIX Specification, V2 (UNIX 98), February 1997). The embodiments presented herein are not limited to these contour representations. Thus, a contour may be represented by a single article or by a collection of articles. Additional metadata and information associated with or about the contour may or may not be stored in multiple distinct articles.

Distinguishable in the use of the term contour herein, it should be noted that in the VAC (Venti ArChive) archive application (S. Quinlan and S. Dorward, "Venti: A New Approach to Archival Storage," *Usenix Conference on File and Storage Technologies*, Proceedings of the FAST '02 Conference on File and Storage Technologies, Jan. 28-30, 2002, Monterey, Calif., USA. USENIX 2002 ISBN 1-880446-03-0 2002, pp 89-101), a VAC contour is represented by a hierarchical hash tree. Leaf nodes represent the blocks of files to be archived. A unique hash fingerprint is associated with each block. To represent a file, an ordered block of hash fingerprints is used to designate the sequence of blocks constituting the file. One or more of these "pointer blocks" may be used to represent a file. Each of these pointer blocks may be represented with a unique fingerprint as well. By way of recursion, therefore, a tree rooted at a single pointer block comprising a single fingerprint is used to represent the file. Files in a directory can be represented with metadata and the fingerprints of the respective file hash trees. By way of recursion again, all of the files and directories within a VAC contour—even if disparate (e.g., a set of files or directories that do not share common parent directories)—can be represented as a hierarchical hash tree rooted at a single pointer block comprising a single fingerprint representing the entire VAC contour. FIG. 1 illustrates a hierarchical hash tree according to the VAC methodology. Note that the order of hash fingerprints is critical for determining the order of the file blocks constituting a given file.

The "null contour," herein, refers to a contour that has no constituent element articles. That is, a contour over an empty collection of articles. Usually, there is no need to explicitly associate any metadata (e.g., creation time) with such a contour. The "null contour" often represents a point in time before which any contour was created simply because it was not necessary or the constituent articles did not exist.

Herein, a "differential contour" refers to a contour representation that comprises differences between some given reference contour and the new contour. An identifier for the reference contour must be stored as part of the differential contour. A differential contour contains information about articles present in the new contour, but not present in the reference contour. These are referred to as "additions." Additionally, the differential contour includes information indicating articles that appear in the reference contour and are not in the new contour. These are referred to as "deletions." If articles have been modified, then this is indicated in the differential contour as a "modification." In one embodiment, a modification to an article will be represented by a "deletion" of the original article and the "addition" of the new article.

If differences between the reference contour and the new contour are few, then differential contour representation is very space efficient. The reference contour may be the null contour. In this case, all articles in the new contour are included in the differential contour as additions. Note that it is most useful for the reference contour to be over the same set or closely related set of articles. Only the set of articles contained in the intersection of the reference contour and the new contour can be represented differentially. If the intersection of the sets of articles comprised by the reference and new contour is empty, then using the reference contour is effectively the same as using the null contour as a reference with regard to the additions that must be represented in the differential contour. Because of this, it may sometimes be preferable to use the null contour instead of a poorly matched (non-null) reference contour to avoid having to detail the deletions in the differential contour.

An example of a reference contour is as follows:

- a contour that was generated after installation of operating system/application software or downloading of multimedia articles, etc., such as the initial state of a computer system before first use;
- a contour representing the initial state of application software before first use;
- a contour representing the state of multimedia articles after initial installation;
- a contour representing all articles on a computer system when initially set-up or manufactured by a computer system manufacturer/distributor or prior to a first backup or at some other time;
- a contour representing the state of an application or application package supporting a class of articles. For each article, a set of articles may exist to operate on the specific article, or interact with the article (such as, picture viewers that allow pictures to be viewed, music players, word processors, etc.). Useful or related groups of articles can exist for applications or multimedia materials, such as, word processor packages, network browsers, database packages, documentation, movies, pictures, music, specific operating systems, combinations of the aforesaid, etc. Such predefined or standard reference contours are possible because installed or downloaded applications are often placed at the recommended default location in a computer's article system hierarchy and contain a pre-determined set of articles; and
- a contour derived from other information on a computer system (e.g., library behavior during run-time, linker/loader information, startup/shutdown behavior, etc.).

The selection of the reference contour directly determines the size of the differential contour representations. In one embodiment, various algorithms can be used for selection of the reference contour in order to minimize computation or bandwidth requirements. Examples of these algorithms include: always select the null reference contour (i.e., the differential contour consists of the full contents of the new contour); always select the previous (last) contour; randomly select a reference contour (this algorithm can be used for validation and integrity checking); and generate the minimum distance reference contour, which can be computed. In one embodiment, a client determines the reference contour selection algorithm used.

A differential contour is a form of a "compressed contour." In a compressed contour, metadata is used to reduce the verbosity of the contour representation and therefore create a more compact representation. In a differential contour, the associated metadata includes an identifier of the reference contour used in generating the differential contour. Herein, an "expanded contour" or "expanded-form contour" refers to a contour that is not compressed in this manner. An expanded contour representation requires no other contour to be referenced in order to determine the contour's full contents. One should note that compression through the use of metadata is distinguishable from compression from known encoding compression techniques (e.g. Lempel-Ziv compression algorithms, named after Abraham Lempel and Jacob Ziv), which can also be used with compression through metadata.

Herein, a "contour patch" refers to a set of changes (e.g., edit commands and data/metadata) to be made to selected portions of a contour or the articles represented in a contour and/or functions applied over a contour. Unlike a differential contour, contour patches permit finer-grained modifications to the contour and its constituent metadata and articles. Some contour patches will prescribe, for instance, a patch function that might re-compute all of the Content Identifiers (CI, see below) within a contour using a new function. Applying a contour patch to a given contour results in a new contour. Contour patches can be used to represent fine-grained changes (e.g. edits) to a given contour or article. For example, suppose articles within contour Z have been backed up by a backup service. Later, a second backup is made using contour Z as the reference contour. If a particular article (or set of articles) representing a log file is the only article that changed, the client could opt to send a differential contour consisting of indications that the old log file should be deleted and the new log file added. In this case, articles representing the entire "new" log file must be sent. Suppose, however, the number of changes to the articles representing the log file is much less than the total log file size. This is a case where a contour patch is efficacious. Specifically, the client could choose to send a contour patch which would indicate that contour Z' could be constructed from contour Z by simply making the prescribed set of edits to a relatively small number of articles in Z (i.e., the log file in this example). Contour patches also cover binary patches to articles, such as compiled machine code or encoded data representations.

In one embodiment, metadata, such as article permissions or directory path names, can have default values. This is useful since many articles have identical attributes because of standard installation procedures. When standard default values can be assumed, then both storage and bandwidth requirements can be reduced. When there are exceptions to standard default values it is permitted to specify contour overrides that change these default values. Contour overrides can also be used to change non-standard data. For example, a contour containing articles belonging to user id 'jimolder' might have an override applied such that all 'jimolder' user ids are changed to 'jimo'. This might be required if a user, say Jim Older, moves from one system to another and their user id changes from 'jimolder' to 'jimo'.

Clearly, contour patches are another differential representation form that can be used to reduce the bandwidth required between client and server. Note also that it is possible that after the generation of a reference contour, subsequent contour generation may only create only contour patches. Intermediate contours can be constructed by applying the contour patches in order. (Sequentially applying contour patches in their evolution order may be required when the patches affect the same articles or metadata within a contour.)

Differential representational forms (e.g., differential contours and contour patches) are often more storage space efficient, but trade storage space for time used in computing the corresponding expanded form. In order to convert a differential contour into an expanded form, the chain of reference contours must be available. Chaining of subsequent contours to previous contours, etc., allows for an expanded representation form to be constructed. Therefore, it is evident that the differential contour form is often more compact than an expanded contour. The necessary reference contours, however, must be available for expansion. For transmission efficiency with respect to differential contours, the benefit is available only if both sides already have all of the necessary reference contours. In one embodiment, the greatest time cost is in computing the most space efficient differential contour. Several differential contours may need to be generated in order to calculate distance metrics to optimize space efficiency. Space efficiency often translates into transmission efficiency since there is less information (e.g., only the differences) to transfer.

Herein, a "collection contour" refers to a contour representation that comprises a collection of contours. Collection contours typically comprise a collection of contours that are mutually exclusive; that is, for any pair of contours in the collection there are no shared articles. Collection contours can, however, contain one or more contour pairs in which there are shared articles. For some operations the presence of shared articles is of no consequence. Each constituent contour in the collection can be evaluated or treated separately. For other operations, such as the conversion of a collection contour into an expanded representation, the sharing can require additional policy rules, possibly including human intervention. Collection contours, like differential contours, also make use of reference contours. Reference contours are used by collection contours to describe or point to a constituent contour element in the collection, not as a reference for computing differences. This permits large space savings as only the name and certain associated information about a contour need be saved in the collection. The reference contour is assumed to be stored as a separate contour entity.

Herein, the use of the term "contour" may also refer to any of the above representations, including hybrid (contour) representations. Hybrid contour representations can include, for example, nested collection contours (collection contours of collection contours), differential collection contours (differentially represented collection contours), etc.

In one embodiment, metadata and policies are used to appropriately designate the representation used within a given contour. In the case of differential contours, for instance, this will include reference contour information. As required, additional metadata and management policies are used to permit proper information organization, transfer, processing and storage.

In one embodiment, the most efficacious representation of contours is determined (e.g., expanded, differential, collection, etc.) in terms of storage, processing (manipulation) and communication efficiencies. For example, there are times where an expanded contour representation could be more efficient than a differential contour representation if the representation of differences between the reference contour and the new contour is so large that the total differential contour size is greater than that of the expanded contour. In another embodiment, differential contours with a null contour as the reference contour can be recognized, manipulated and stored as expanded contours.

A Content Identifier (CI) includes a value representing the contents of an article. In one embodiment, the CI includes a signature of the article's contents. In another embodiment, the CI is relatively small in size, e.g., 24-48 bytes. In yet another embodiment, the CI is generated using a cryptographic hash algorithm, such as a message digest algorithm (e.g., MD5) or secure hash algorithm (e.g., SHA-1). In this embodiment using well-known cryptographic hash algorithms, a signature value characterizing the specific article's content is generated. One should note, however, that other cryptographic algorithms, content-derived or attribute-derived signaturing algorithms (e.g., cyclic redundancy check (CRC) checksums), or compression mechanisms may be used with other embodiments. Collectively, herein, these methods are referred to as "content-signaturing" or simply "signaturing" mechanisms and the output of the methods are referred to as a "content signature" or "signature." One should also note that any portion or combination of the above mentioned generation means for a CI may be combined together, or used separately for different embodiments.

A number of content signatures may be combined, through a variety of mechanisms (e.g., concatenation, Boolean bit-wise exclusive-OR'ing, etc.), to form a CI. By using one or more content-signaturing mechanisms to generate CI values, the CI uniquely identifies, for all practical purposes, the contents of a particular article, not just on the user's system, but across the sample space of all computer systems.

In one embodiment, CIs are used to establish a partition over a set of articles A serviced by a server using a CI-based equivalence relation; that is, two articles are considered to be "equivalent" and belong to the same block of the specified partition if they have the same CI. By definition, partition blocks contain mutually exclusive elements, each partition block is non-empty, and the union of all blocks in a partition is the set A. Note, however, that if two articles have identical CIs, it does not necessarily mean that their location (or other associated metadata) is the same. It is preferred that the CI-based equivalent relation produces the same partitioning of the set of articles serviced by the server as does the equivalence relation produced by pair-wise comparing respective article contents. These two partitions can differ if CI aliasing occurs. Aliasing of CIs occurs when two articles with differing contents have an identical CI assigned to them. Although technically possible, aliasing is highly unlikely with the choice of a robust content signaturing mechanism.

It is advantageous for the set of articles to be large as possible since more equivalent articles, hence redundancy, can be discovered; only one instance/copy of an article need be maintained for each block in the partition. However, there are cases (e.g., for security, performance or reliability) where some sets of articles may need to be processed separately.

To decrease the probability of CI aliasing, in one embodiment, the CI includes a combination of one or more cryptographic hashes, augmented by a content signature generated from a subset of article contents or metadata associated with the article. For example, a content signature generated by an MD5 secure hash algorithm may be augmented with article size information (appropriately formatted by a content signaturing mechanism) to produce a more robust CI. It is preferable to employ a CI derived only from the contents (e.g., cryptographic hash of the article contents) or metadata concerning the contents (e.g., content length). As other items of metadata are introduced, system correctness is maintained, but efficiency is reduced, as multiple articles with the same contents but different metadata may no longer be linked (i.e., mapped) to a single copy of the contents on the backup device.

By applying a content signaturing algorithm to a contour, a contour content identifier (CCI) is generated. This process is analogous to creating a CI for an article.

In order to increase the degree of redundancy that may be exposed, in one embodiment, articles of certain types may undergo one or more normalizing transformations into a standard, possibly canonical, format prior to calculation of content identifiers. In this embodiment, content identifiers may be generated based on the normalized representation's contents and metadata. For example, an article representing a file in a compressed format (e.g., a file compressed using a zip type compression or some other compression algorithm) may be transformed (i.e., decompressed) so that the content identifier is generated from the expanded contents and expanded size. Important metadata, such as the archiving or compression technique used, would be added to the collection of metadata for these articles. Herein, this is called "contour transform metadata" or "transform metadata".

In one embodiment, articles of certain types may be transformed to expose a collection of constituent articles contained within a single article. For example, an article representing a file in a specific type of format may be replaced with metadata and article contents for the articles that comprise the file. Important metadata such as archiving or compression technique would be added to the collection of metadata for these articles. Examples of such compound articles or article collections include, but are not limited to, archives (shell, tar, ar, library, etc.), multi-resolution representations of multimedia (e.g., different compression rates for music, video, or still pictures), local restoration media (e.g., install disks, local backups) etc. Metadata describing this are a form of transform metadata.

In one embodiment, normalizing transformations may be applied only to a subset of possible candidates. For example, the decomposition of collection articles may only occur the first time that an article is presented to the backup service. Compressed articles may be uncompressed only if they are of a certain size or type, or as a function of the resources of the client machine (e.g., disk space, computational resources, available memory, etc.). Metadata describing this are a form of transform metadata.

In one embodiment, a portion of the articles may be encrypted before presentation to the backup service. In another embodiment, encryption occurs only for files that are specifically designated for encryption by the user or designated for encryption through filtering rules. Example filtering rules might include: 'encrypt all locally generated content' or 'encrypt all spreadsheet articles.' In one embodiment, multiple clients (e.g., computers from the same company) may employ identical encryption keys and algorithms to increase exposed redundancy. Metadata describing this are a form of transform metadata.

In one embodiment, the backup service may service multi-tiered organizations or organize backups in a hierarchical manner. This can permit naming efficiencies in content identifier representations as well as domain/tier-specific redundancies to be exploited. It also permits control over CI aliasing. In this case, the algorithms used to compute content identifiers (CIs) establishes a name space, where each article is associated with a name, which is the CI. Metadata annotations to contours or hierarchies of contours permit these name spaces to be managed efficiently. Such metadata may capture or re-map CI names from associated local media (e.g., restoration disks) to the local CI namespace. Metadata describing this are a form of transform metadata.

In one embodiment, the content identifier (CI) for the encoded article is first sent to the backup server, and additional communication phases may be introduced in which the server requests an expanded representation for a set of encoded articles.

A content signaturing mechanism identifier may be associated with a particular content signaturing mechanism. This versioning information can prevent cross-algorithm aliasing and permit a system to be migrated to an improved CI generation mechanism, if desired (e.g., over time, the system may change the mechanism in use). This identifier may be used to facilitate systems where multiple content signaturing algorithms are in use simultaneously. This identifier may be used as metadata in computing content signatures, implicitly including the identifier in every CI generated. Alternatively, as discussed below, the identifier may be stored explicitly and not used explicitly in the computation of CIs.

CIs may be included in a contour to capture the state of the article contents. In one embodiment, a contour may consist of only a list of CIs for the articles included in the contour.

FIG. 2 illustrates Client-Specific Article Descriptor (CSAD) 200 as used by one embodiment. CSAD 200 includes an article's CI as well as all metadata required by the article's system to restore the article metadata to the current state (i.e., everything except for the contents). In this embodiment, CSAD 200 includes a CI, article name, article location within the system (e.g., directory path name), article size, time stamps (e.g., time of creation, modification, last accessed, when archived), access permissions, user identification, group identification, and article type. One should note that other metadata can be used with the different embodiments. For example, CSAD 200's fields can vary according to the systems (e.g., devices, operating systems or file systems) in use on the client. Also, fields present can be derived from implicit information, for example, the location of a flash memory image in a router, or explicitly, such as from directory information. In one embodiment, required metadata can be a subset of available metadata—e.g., on some system "last-accessed time" may not be included in CSAD 200, even though it is available on the system containing the article. In one embodiment, a content signaturing mechanism identifier is included in CSAD 200 to reflect the algorithm used to generate the CI.

FIG. 3 illustrates Client-Invariant Content Descriptor (CICD) 300 includes a CI, article contents and can also include commonly shared metadata (e.g., article location (e.g., path name), access permissions, article size, etc.). In one embodiment, a content signaturing mechanism identifier is included in CICD 300 to reflect the algorithm used to generate the CI.

CICD 300 is identified (i.e., referenced) by a CI. In one embodiment, CICD 300 includes a content field that contains the contents of the articles with the corresponding CI. In another embodiment, CICD 300 also includes default information that can indicate metadata values that are frequently associated with articles containing this content. For example, this default metadata can include a default article location, default access permissions, etc. In one embodiment, CICD 300 contains multiple default information structures that are indexed by some metadata associated with the client (e.g., operating system, machine classification, user classification, etc.).

In one embodiment, CSAD 200 is generated for each article stored on the system. In another embodiment, once the backup server has received CSADs for the articles to be backed up, a mechanism exists for efficiently representing the information contained in the CSADs as well as maintaining metadata about the client and transaction that generated a given CSAD. In this embodiment, the backup server maintains a Client-Specific Article Record (CSAR) for each article on the client system. The CSAR contains the necessary information to reconstruct a CSAD from a CICD. In one embodiment, the CSAR contains all of the metadata originally associated with the article on the client system. In another embodiment, the CSAR contains information to select the appropriate set of defaults from the CICD as well as client-specific metadata that differs from the specific set of defaults. In one embodiment, the CSAR also contains metadata about the backup status of the article (e.g., the contours to which it belongs, date/time of backup, etc.).

As previously described, a CSAR can contain override metadata for a specific article whose contents and associated default metadata (e.g., article path name, article permissions, article owner, etc.) are stored in the CICD. In this embodiment, override metadata can be used to provide article-specific changes. In one embodiment, override metadata may not only include attributes of articles, but may also include rules (e.g., regular-expression-based rules), filters, or other specification, execution and policy mechanisms that permit the application of overrides to a contour and/or the contour's constituent components (e.g., articles, article groups, collection contours, etc.). Herein the term "override metadata" comprises these cases.

In one embodiment, override metadata can be associated with an article, a set of articles, a contour, a collection contour, etc. In one embodiment, override metadata is stored with the associated item. In one embodiment, override metadata is stored at some level in a nested set of contours and is applied to designated contours and/or subordinate contours, i.e., contours and articles at lower nodes.

In one embodiment, override metadata is stored outside of the contour, but contains additional information that designates the contour, contours, or articles affected. In one embodiment these designations are explicit where specific entities are identified. In another embodiment, specific entities are not necessarily identified, but rules or filters applicable are used to select and modify the contents or constituent entities or elements of a contour. For example, override metadata (e.g., a filter) can be applied to a contour to select only a subset of the articles (or contours) in the contour. In one embodiment, override metadata can be used to change, for example, the default article owner designation, article permissions, or the root path name for all articles with a particular pathname prefix.

In one embodiment, a connection is established between the backup service and the client's system (e.g., remotely; i.e., the backup service is implemented on a separate logical device, loaded in a different virtual device, etc.; or locally, where the backup service is implemented on the same device). In this embodiment, the client generates a CI for each article that is stored on the client system. The client's system transmits the CIs to the backup service. Since these CIs identify articles uniquely, the backup service can determine whether a CICD corresponding to the CI exists on the backup service's designated storage device. If the backup service determines that it already has a CICD for an article's CI, there is no need for the client system to upload the article contents for backup on the server. If the CICD is not present on the backup service's designated storage device, the client transfers the article's contents and possibly additional data, to the backup service.

In one embodiment, the client generates CSADs for each article that must be backed up. These CSADs can include CIs and metadata associated with the articles. These CSADs are transferred to the server, which can store the CSAD. In another embodiment, the CSADs are stored on the client and only CIs are transferred to the server.

In one embodiment, the backup service retrieves and stores exactly one CICD for each CI across all client systems. In one embodiment, the backup service only requires one copy of the CICD of an article, but can create additional copies to be used, for example, for reliability, availability, serviceability, privacy or performance purposes.

Figure 4:
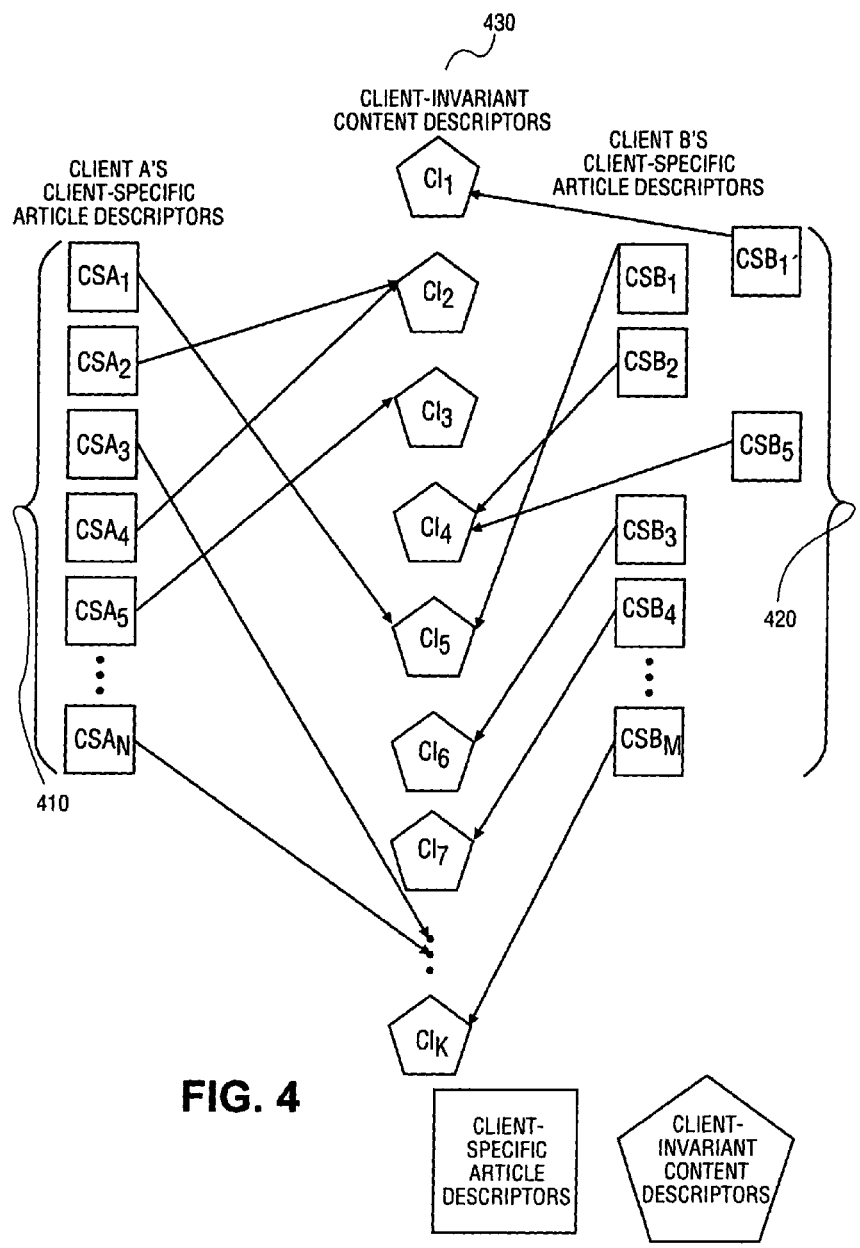
FIG. 4 illustrates an example organization of client-specific article descriptors and client-invariant content descriptors by an embodiment.

FIG. 4 illustrates an example where only one CICD per unique CI is stored at a backup service's designated storage device and can be retrieved by one or more clients. As illustrated in FIG. 4, a first client (i.e., client "A") has a group of articles stored on client A's computer system. The articles are represented by CSAD 410 ($CSA_1$-$CSA_N$). Likewise, a second client (i.e., client "B") has a group of articles stored on client B's computer system. The articles are represented by CSADs 420 ($CSB_1$-$CSB_M$). CICDs for these articles are represented by nodes 430 ($CI_1$-$CI_K$), which include article contents that are identical to the contents of respective articles on client A's and client B's respective computer systems. The articles associated with CICD nodes 430, however, can exist on client A's and client B's computer systems with varying names, attributes, etc., even though CICD 430 contains the same article contents (i.e., client-specific information can vary across clients).

Note that FIG. 4 shows a state that might be found after the backup service had been run on both client A and client B and no additions, deletions, or changes to any of the articles on either system had been made yet. That is, every CSAD has a corresponding CICD on the backup service. If changes are made to articles on the client system and a new set of CSAD's are computed, there are intervals where there may not be corresponding CICD's stored by the backup service. In that case, the backup service will transfer the articles and create the requisite CICD's to reestablish this coherent backup state.

The arrows in FIG. 4 indicate the pairing relationships between CSAD and CICD nodes. The relation is determined using the CIs; a relationship exists if a CSAD's CI is equivalent to a CICD's CI. For any given CSAD, there is exactly one corresponding CICD. Multiple CSADs, whether intra-client or inter-client, can share a single CICD. For example, client A's $CSA_2$ and $CSA_4$ both point to the $CI_2$. Thus, client A has two copies of the article contents represented by $CI_2$ and their locations (e.g., path names), permissions, attributes, etc., are described by $CSA_2$ and $CSA_4$, respectively. This is an example of intra-client article redundancy. Similarly, client A's $CSA_1$ and client B's $CSB_1$ share the same article contents, represented by node $CI_5$. This is an example of inter-client redundancy.

In one embodiment, the backup service is provided with complete contours of the client computer systems (representing a complete backup of the client systems), yet it requires very little additional bandwidth from client-to-server or storage at the backup service designated storage device. The contour generated by the client can include all of the client's computer system articles or may be a proper subset. The contour can then be used to restore the client system to a known state at a later time.

In one embodiment a Standard Content-Derived Signature Contour (SCDSC) comprises a fully expanded, content-derived signature contour, or a collection of CIs derived through signaturing operations on a hierarchical decomposition of a fully expanded, content-derived signature contour.

Figure 5:
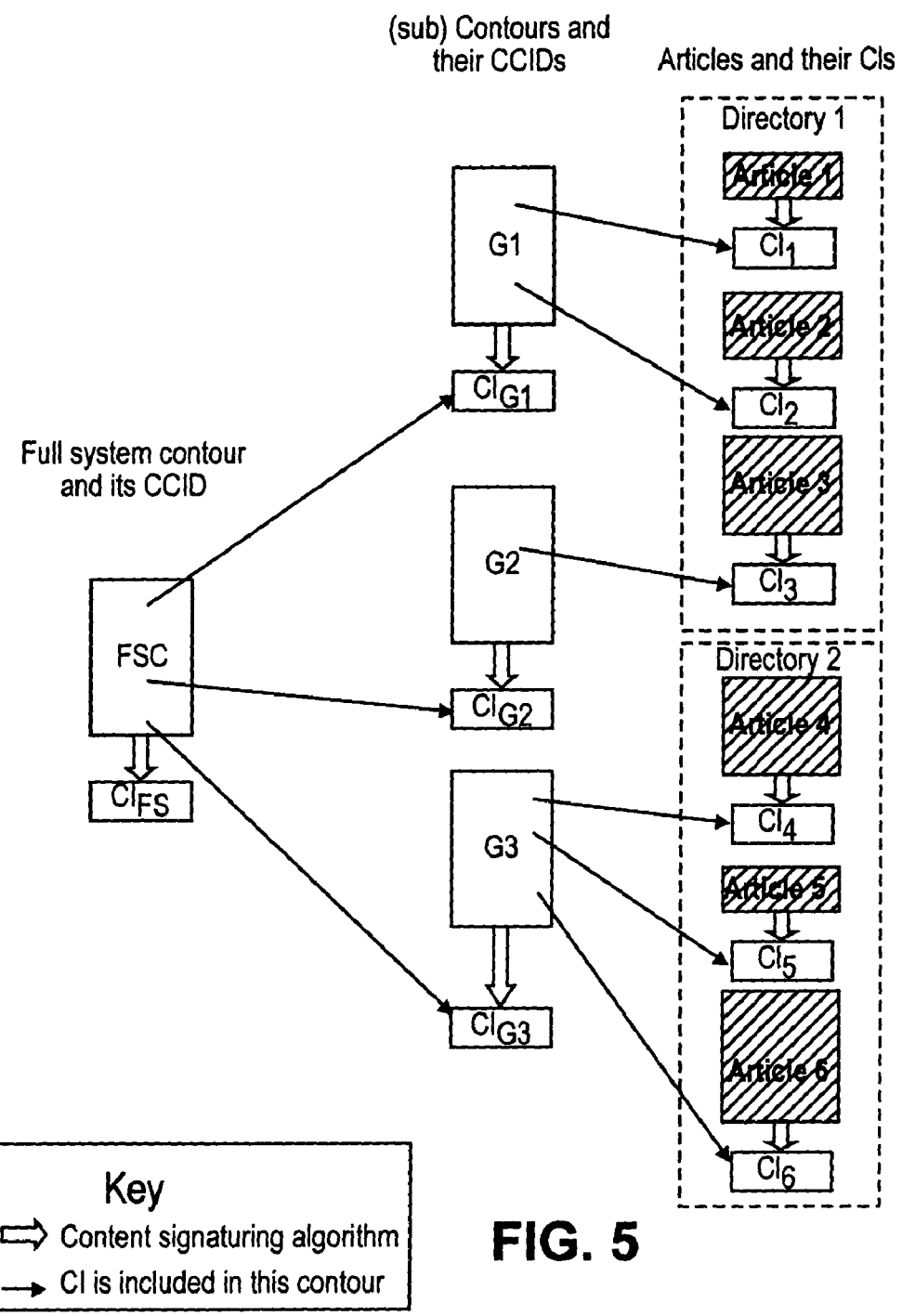
FIG. 5 illustrates a recursively computed content identifier tree.

In another embodiment, an SCDSC comprises a fully expanded contour including a recursively computed content-identifier tree (e.g., analogous to hash trees). FIG. 5 illustrates such a tree. As shown in FIG. 5, CIs are computed over the articles. Signatures may be organized with metadata and collected together in CI pointer blocks (e.g., G1, G2, G3) to capture article information. Note that pointer block sizes may vary and there may be fixed maximum pointer block sizes to maximize redundancy. Such signature/metadata pointer blocks, in turn, are recursively signatured, creating a hierarchy of signature pointer blocks, until a single root signature (captured as a pointer block consisting of one signature pointer) is obtained for the contour (e.g., $CI_{FS}$).

Therefore, a wide variety of article types are accommodated and pointer block construction is generalized. All nodes within this content-identifier tree, including pointer blocks, are stored on the backup service. Note that in order to simplify the figure and discussion, FIG. 5 does not show the inclusion of metadata in the pointer blocks.

In one embodiment the CIs within a pointer block may be represented as an ordered list of CIs. In this embodiment, such an ordering represents implicit metadata such as the required order of articles. In other embodiments, other useful CI ordering within the pointer block include, but are not limited to, the most frequently accessed article order, ordered by article size, a total ordering of the CI's (e.g., sorted in ascending or descending order), etc. The CIs within the pointer block may simply be a collection; that is, there is no metadata (information, relationships, etc.) to be represented. This means there is no required ordering of the CIs within a pointer block, although the chosen order can affect redundancy (as will be discussed below). The important thing to note is that pointer block contents and the content signaturing algorithms used to compute the CI for a given pointer block affects overall system performance (e.g., amount of redundancy that can be exploited across CI pointer blocks.) Thus, canonical or frequently encountered pointer block constructions are important.

In one embodiment an Optimized Content-Derived Signature Contour (OCDSC) is generated to increase the efficiency of information exchange. A Content-Derived Signature Contour (CDSC) may be either a OCDSC or an SCDSC. Both OCDSCs and SCDSCs are forms of content-derived signature contours (CDSC) and, as such, when references are made to a content-derived signature contour, it may mean either an OCDSC or SCDSC. In one embodiment, an OCDSC may include, for example, at least one of the following:

- a differential contour derived from an CDSC plus differential data;
- CDSC contour plus contour patch data;
- CDSC contour plus contour override data;
- an CDSC contour plus contour transform data;
- an CDSC contour plus content access (e.g., cost) metadata (e.g., an article access cost database), such as from local media; and
- an CDSC modified to optimize size or contents to decrease bandwidth requirements or to increase redundancy.

In one embodiment, a local media database contains information concerning the access costs of articles represented in a contour. In one embodiment, the contour may contain representations of the media that a user may have locally (e.g., an installation CD (Compact Disk media) for an operating system or application suite, etc.). This is described in more detail below. In one embodiment, the costs may represent the network cost (e.g., bandwidth requirements, cost per unit of bandwidth, etc.) to access articles. In another embodiment, representations may include costs to access article contents available within a corporate intranet (e.g., a software distribution portal), or the Internet (e.g., a vendor's website, or a file repository).

Figure 6A:
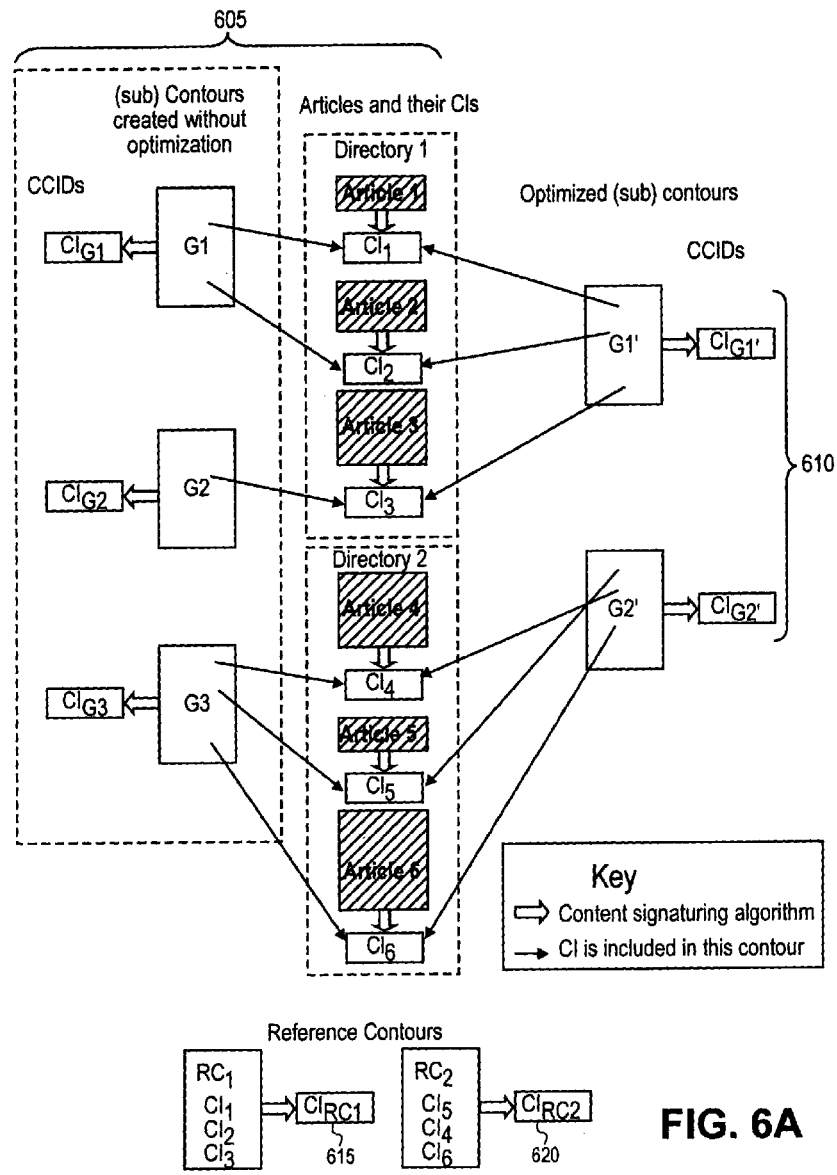
FIG. 6a illustrates an optimized content-derived signature contour.

FIG. 6a shows two examples of the generation of contours: the first (605) without any optimization (i.e., an SCDSC); and the second (610) with optimization (i.e., an OCDSC). As in the discussion of FIG. 5, metadata is not included in any of the contours to simplify the discussion.

In the first example 605, G1 contains the CIs for articles 1 and 2 (in that order), G2 contains only the CI for article 3 and G3 contains the CIs for articles 4, 5 and 6 (in that order).

When passed through a content signaturing algorithm, the contours G1 and G2 produce Client-Invariant Content Descriptors (CCIDs) $CI_{G1}$ and $CI_{G2}$. In this case, the CCIDs for the subcontours do not match the reference contour CCIDs $CI_{RC1}$ or $CI_{RC2}$. In the case of contours G1 and G2, the selection of which articles to include in the contour affected the matching of the reference contour ($RC_1$). In the case of contour G3, the ordering of the constituent elements did not match the reference contour ($RC_2$).

FIG. 6a also illustrates the generation of an OCDSC for the same set of articles (610). In this second example, G1' contains the CIs of articles 1, 2 and 3 (in that order) and G2' contains the CIs of articles 5, 4 and 6 (in that order). The CCIDs of these contours matches those of the reference contours (i.e., $CI_{G1'}=CI_{RC1}$ 615 and $CI_{G2'}=CI_{RC2}$ 620)

In order to optimize the generation of contours, the client may be programmed with heuristics that are more likely to generate contours that match reference contours. For example, the client may create contours that (1) include articles from only a single directory and (2) order CIs according to the size of the articles that they represent, in ascending order. If reference contours are built in the same fashion, it is more likely that redundancy will be exposed. This is shown in the generation of G2' in FIG. 6a.

Alternatively, the client may optimize the generated contours based on explicit knowledge of the available reference contours. For example, as shown in the second example 610 in FIG. 6a, the client generates contour G2' with knowledge of the reference contour RC2 620. This may be reasonable, for example, for standard installations (e.g., an OS or application).

In one embodiment, an accuracy check operation (i.e., a checksum, comparison, etc.) is performed where a previous contour plus patches have been applied to produce a new contour. For example, after applying the contour and patches, a new CCI may be generated and compared to a CCI on the respective server to verify correspondence to the expected contour identification.

In one embodiment, a redundancy exposing contour is a type of contour in which articles of known collection types (e.g., tar files, zip files, etc.) are expanded and provided with metadata regarding the complete collection. It should be noted that this approach may provide great savings when compressed or encoded collection components are only slightly changed. Additionally, for articles representing audio and visual media files (e.g., MP3 (Moving Pictures Expert Group (MPEG)-1 Layer 3 Audio) audio files, MPEG movies, etc.), embedded metadata (e.g., MP3 tag information) may be extracted into an article separate from the audio information article(s). Since many users may have identical audio information but varying metadata, this operation may expose additional redundancy.

In one embodiment a factored contour increases efficiency by use of a single metadata object to represent metadata for a number of articles (e.g., the specification of owner ID and access permissions for a collection of files in a directory tree), or through the representation of a collection of articles and metadata through a contour representing that collection of articles. For example, for a contour representing the articles for an application suite, such as office productivity software (word processor, database, accounting, communication, presentation, etc.) all articles may have the same owner ID, permissions, etc. This may be represented by a single metadata override. In one embodiment a metadata override object may be included with the contour to alter metadata for the articles represented (e.g., to alter the file owner, the access permissions, timestamps, etc.).

Figure 6B:
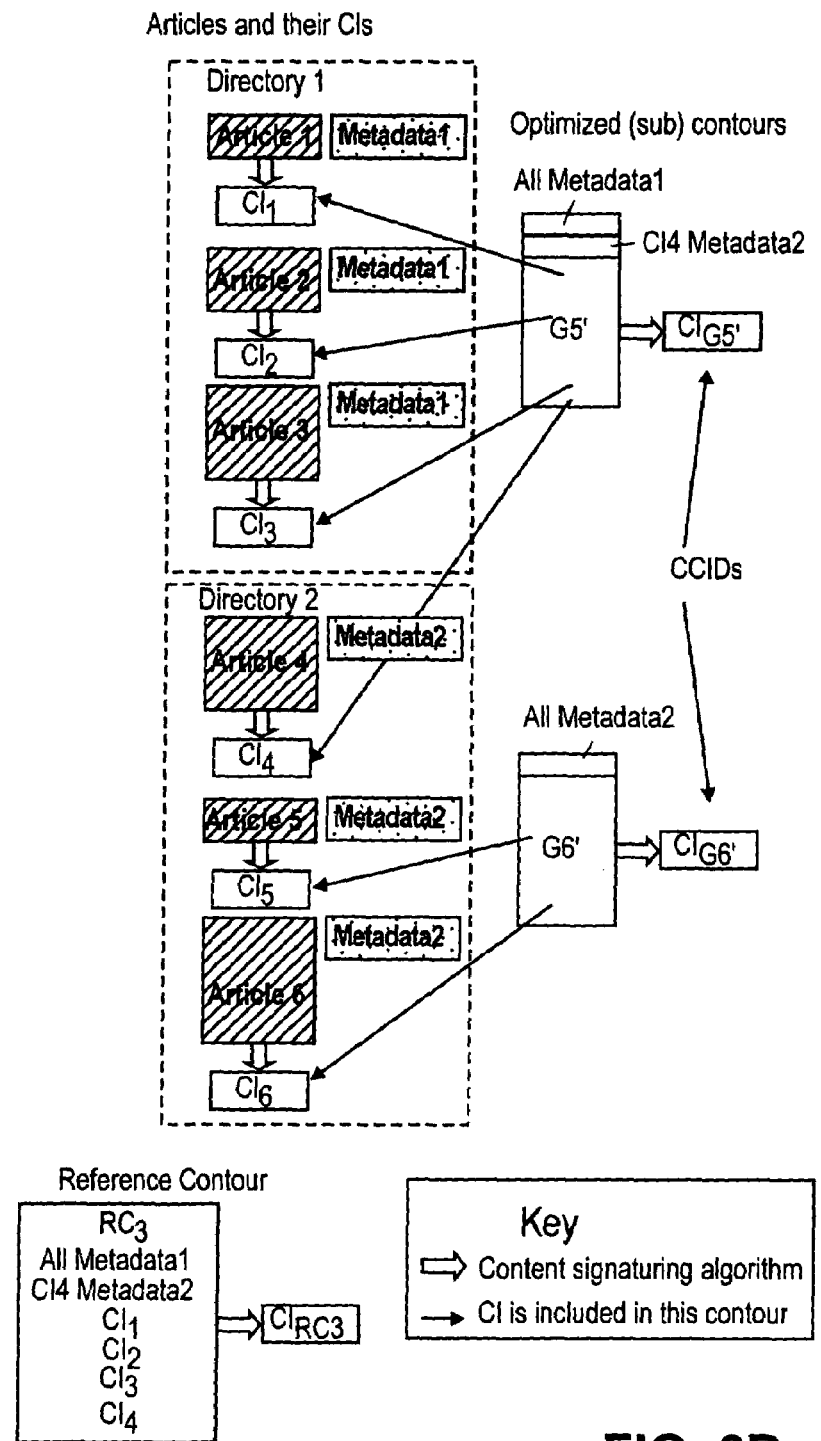
FIG. 6b illustrates an optimized content-derived signature contour.

FIG. 6b illustrates an example of the generation of an OCDSC. In this example, metadata is included in the contours G5' 605 and G6' 610. Since all articles captured by the G6' 610 have the same metadata (Metadata2), it is factored out and only a single copy stored. An additional metadata tag indicates that Metadata2 is applicable for all articles represented by the contour G6' 610. In contour G5' 605 a similar situation exists for all articles sharing common metadata Metadata1, except for article 4. In this case, an override item list (consisting of a single item) overrides the association of Metadata1 with article 4. Instead, the proper association of Metadata2 is made with article 4. The factored metadata may be associated (inclusively or exclusively) in numerous ways that are apparent to those skilled in the art (e.g., using lists, regular expressions, lookup tables, etc).

In one embodiment, an SCDSC can be generated from an OCDSC to perform a task. This transformation from OCDSC to SCDSC may be necessary to communicate contour information with another system or application or may be required to perform further (different) optimizations on the contour. The representations chosen may or may not be equivalent, depending on the target use or requirements (some operations are information preserving, while others are not, e.g., the deletion of certain information). Representation transformations are commonly required to suit different purposes, algorithms, analyses, etc. In some cases, this transformation may be trivial or unnecessary. For example, the OCDSCs shown in FIG. 6a requires no sophisticated transformation to create an SCDSCs as the optimizations performed were only with regard to the ordering and partitioning of the articles into (sub) contours. However, in other situations, the optimization may modify information in the original SCDSC more substantially, as discussed with regard to FIG. 6b. In this case, the conversion of the OCDSC requires removing the factoring of metadata.

In one embodiment, a client may request restoration of at least some portion of the system to a previously archived (backed-up) state (stored on the server). In one embodiment, the client will provide the current system contour (or CCI) as well as a requested contour. As will be discussed below, these contours may be represented by CCIs. The backup server may respond with a restoration contour that may include necessary metadata.

In one embodiment local media is tracked as media (such as CDs/DVDs, flash memory cards, floppy disks, etc.) are loaded on the local machine. As these media sources are used on the client machine, the backup system may inventory the contents of the media (e.g., compute CIs, build contours, compute CCIs, etc.) for use in possible future restorations (as described above). Restoration from local media can substantially speed up recovery of large numbers or amounts of articles as compared to lower bandwidth connections to the remote backup service. In one embodiment media access costs are determined using pricing associated with the latency or bandwidth characteristics for the various network connections on the system Hence during a restoration, in addition to the restoration contour and metadata, as described above, the backup server may provide a local media descriptor that provides information about locally available articles that can be queried to obtain portions of the needed contents. Locally available articles may include those currently on the client system (as detailed in the current system contour sent to the server) or in locally available media (e.g., installation CDs). In one embodiment, the restoration contour will contain contour patches to transform local data to the desired data.

FIG. 7 illustrates a block diagram of an embodiment having a backup process 700. Backup process 700 shows activity for interactions between a single client and server, but note that the process may be occurring simultaneously at many client systems connected to the same server or a plurality of servers. A single physical client may contain a plurality of logical clients (e.g., virtual machines). The backup process 700 is initiated in block 710. For example, a user on the client's computer system, an automatic or semi-automatic process on the client system, an automated process on a remote backup server, etc. may initiate the process. Process 700 continues with block 713 to determine the available contour types. Next process 700 continues with block 715 to determine the optimum contour type based on the selection of available contour types made in the preceding block. In one embodiment, the optimum contour type is based on at least one of computational complexity, storage capacity, cost, communication bandwidth, communication latency, and contents of reference contours.

Process 700 continues with block 717 where the files that are to be included in the contour are determined. Once the files to be included in the contour are determined, process 700 continues with block 720, where one or more contours (including contour overrides) or contour patches are generated. In one embodiment, in order to optimize process 700, the contours generated may be optimized, as described with regard to FIG. 6a and FIG. 6b.

In one embodiment, the client contour(s) or patches generated in block 720 are comprised of the various elements specific to each contour type or contour patch. Many of the various contour types (and combinations) are elucidated above. In one embodiment, the client contour(s) or patches are given names, time stamped, and annotated. In one embodiment, process 700 uses a minimal transmission backup strategy by computing a differential contour and possibly one or more contour patches and transmitting them to a backup device. In this embodiment, large articles can be organized into smaller portions or blocks for localized patching and splicing. Thus instead of having to send the entire file, only the edits (commands and article elements, if any) need to be sent.

Process 700 next continues with block 723. In block 723, CCID(s) are generated for the generated contour(s). Process 700 continues with block 725 where communication is established between the client computer system and the backup service. One should note that the communication connection is typically a secure, encrypted connection. Process 700 continues with block 730, where the CCIDs are transmitted from the client's computer system to the backup service. Process 700 continues with block 735, where it is determined whether the CCID(s) are recognized as matching a known contour on the server. If it is determined that the CCID(s) are not recognized as matching a known contour on the server, process 700 continues with block 760. Block 760 sends a message to the client informing of the status (i.e., no matching contour found). Process 700 continues with block 765 where the contour is transmitted to the backup service. Process 700 continues with block 755 (discussed below).

If it is determined that the CCID(s) are recognized as matching a contour on the server, process 700 continues with block 737. In block 737 the CCID(s) are recorded (i.e., stored in memory) on behalf of the client. Process 700 continues with block 740 where the server determines if articles represented by a contour that is represented by CCID(s) need to be sent from the client to the server. That is, if necessary for licensing needs, performance, security, etc. Process 700 then continues with block 745 where it is determined whether files need to be transmitted or not. If block 745 determines that files do not need to be transmitted, process 700 completes and a message is sent to the client informing the client that there is no need to transmit article contents to the server. If block 745 determines that it is necessary for files to be transmitted to the server, process 700 continues with block 755, which generates an article request list as follows. The backup service, using the client contour types or patches, produces a subset list of articles (identified by CIs) for which article contents are not already stored at the backup service's designated storage device. The backup service can, for example, use a database or catalog of articles that are indexed or accessed using their CI to determine if the article contents are already stored. Articles that are not stored at the designated storage device (as determined by indexing the database/catalog with the associated CIs) are added to the article request list. In an embodiment, article request lists might include suggestions for producing a patch response. Process 700 continues with block 756, where the backup service transmits the article request list (including CIs only, as there is no need to send any metadata back) to the client's system.

It should be noted that additional embodiments can transmit alternate article identifiers between the client and server. In one embodiment, the articles in a contour or patch are numbered. The client and server may use this numerical identification when identifying articles in the contours (e.g., in the article request list or in the subsequent transfer of the full article contents). A numerical identification may require less storage space and transmission bandwidth than a CI value because the alternate article identifiers may be smaller than the associated CIs.

The embodiment discussed above transferred the full contents of the article being stored at the server. Alternative embodiments may not transfer the full contents of the article to be backed up, transfer only metadata or transfer only part of available metadata. In another embodiment, less than the full contents of the article may be transmitted. In referring to the actions taken in all of these embodiments, this specification refers to transferring a "portion" of contents of an article or metadata, but it should be understood that "a portion" may also mean the full contents or metadata. In one embodiment, the portion might be in the form of a patch.

Process 700 continues with block 757, where the client's computer system transmits the articles or article portions in the article request list to the backup service for storage at the designated storage device. Here, each article or article portion is paired with its associated CI (or alternative identifier form) and transferred to the backup service. Process 700 continues with block 758, where the backup service stores the requested articles and associated CIs in a database on the backup service's designated storage device. Note that the articles are stored in a form accessed using the CI (or alternate identification mechanism). Block 759 then determines whether all of the articles in the article request list were stored successfully.

If block 759 determines that all the articles in the article request list were stored successfully by the backup service, then process 700 continues with block 770. Block 770 notifies (e.g., transmits a message, etc.) the client's system of the successful storage of the articles. Block 771 then terminates the connection between the client and the backup service. If block 759 determines that the storage of all the articles in the article request list have not yet completed successfully, then process 700 continues back with block 755 and attempts to store only the articles or article portions that have not yet been successfully stored. In one embodiment, the successful storage of articles is verified by mechanisms such as signatures (e.g., checksums), error detection mechanisms, etc. This is further discussed below.

If block 759 determines that the storage of all the articles has completed, the process 700 continues with block 770 where the client is notified of success. Process 700 then proceeds with block 775. In block 775, it is determined if any of the articles transmitted represent contours. If so, in block 780, the CCID(s) of such articles are generated and control proceeds to block 735. Otherwise, control proceeds to block 771, were the connection is terminated and the process ends.

In one embodiment, process 700 can backup articles for clusters of machines (e.g., set of virtual machines, physical hosts, etc.). Example clusters might include a local LAN, or a home network or several PC's. In this embodiment, the machines in a cluster share certain contours (e.g., system files/articles, application files/articles, etc.). In this embodiment, backup time is reduced by avoiding multiple transmissions of the same contour (from each machine in the cluster) to the backup service. In one embodiment, one or more of the machines is elected or chosen to be a "master". In this embodiment, the master handles minor local machine article changes by having customizing (differential) contours that supersede shared contours. The master, in effect, serves to normalize (put into canonical form) communications from the cluster to the backup service. It is the single point of communication. Minor differences between various machines can be captured in separate articles, which may or may not be sent to the backup service. The master can use this difference file to restore the minor local differences of a given article between different machines in the cluster. Often machines in the same cluster are configured similarly and have the same set of users and uses. As such, this methodology leverages local redundancy to minimize bandwidth requirements to the backup service. In the embodiments having a cluster(s), the backup cluster use is an alternative fast/cheap source for restoration of articles in addition to local media and the backup server, especially when bandwidth is limited or costly to the backup service.

In another embodiment, the various machines in a cluster can split duties, possibly in a redundant or replicated manner. For example, one of the machines can determine/retrieve reference contours (e.g., when a new host added to cluster.), one machine can store profiles, etc.

In one embodiment process 700 may involve recursive operations or extensions, including appropriate exit conditions, in order to handle recursively organized contours, that is, contours containing contours or other hierarchically organized articles.

Figure 8:
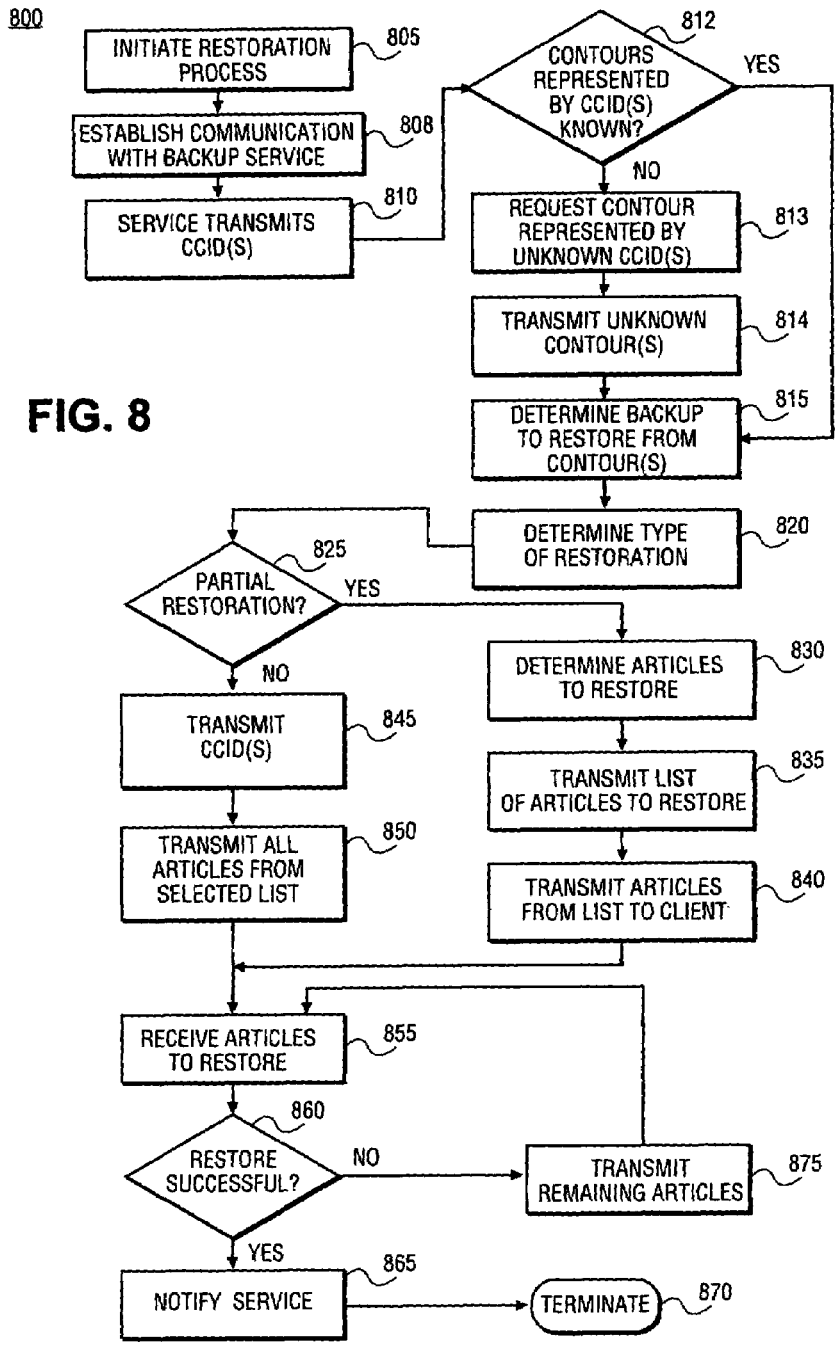
FIG. 8 illustrates a block diagram of an embodiment having a restoration process.

FIG. 8 illustrates a block diagram of an embodiment having restoration process 800. Process 800 begins with block 805, where the restoration process is initiated. As with process 700, process 800 describes interactions between a single client and server, but note that the process may be occurring simultaneously at many client systems connected to the same server or a plurality of servers. As with Process 700, this initiation can be through a variety of manual, semi-automatic and automatic mechanisms. The restoration of articles onto a client's computer system can be used to replace deleted articles, destroyed articles, etc. Process 800 continues with block 808 wherein communication is established between the client computer system and the backup service. Note that this connection can be secure and encrypted for security and privacy purposes.

Process 800 continues with block 810 wherein the backup service transmits CCID(s) representing client contours that were previously stored by the backup service. This may include all contour types or patches stored at the backup service or a subset, and usually is, but not necessarily, restricted to those contours for that specific client. It should be noted that other embodiments can replace the functionality in block 810. In one embodiment, client contour types (including overrides) or patches, or copies thereof, may be stored on the client system (e.g., during the backup process), obviating the need to transfer contour types or patches from the server. Process 800 continues with block 812. If the client computer system has knowledge of the contours represented by the CCID(s), process 800 continues with block 815. Otherwise, process 800 continues with block 813, where the client requests the contour represented by the unknown CCID(s) from the backup service. In block 814, the backup service transmits said contours to the client. Process 800 then continues with block 815.

In block 815, the client determines which articles to restore from the group of contour types or patches received from the backup service. That is, the client chooses all articles described in a particular contour type or patch or some subset of articles in the contour types or patches for restoration. Additionally, in some embodiments, the client can choose restoration parameters. Restoration parameters can comprise, for example, restoration restrictions to a subset of articles in the contour type or patch (e.g., all joint pictures expert group (JPEG) photo files or all dynamic link library (dll) files, etc.), alternate restoration locations, etc. In block 820, the client determines if a partial or full restoration is desired.

Process 800 continues with block 825, which determines whether the client desires partial or full restoration of articles. If the client decides to select a partial restoration, process 800 continues with block 830. In block 830, the client determines which articles are to be restored on the client's computer system. Once the client determines the articles to be restored to the client's computer system, process 800 continues with block 835. In block 835, the client's computer system transmits the list of selected articles to be restored to the backup service. This list consists of CIs (or other identifiers, as discussed above) for the selected articles.

Process 800 continues with block 840, wherein the backup service transmits the selected articles to the client's computer system. Process 800 continues with block 855, wherein the client's computer system receives the articles. One should note, that if the contours or patches include full metadata information, the articles restored will have the client-specific information as they had at the time they were stored at the backup service (e.g., article path name, permissions, time stamps, attributes, etc.) although restoration parameters can alter one or all of them by, for example, restoring them in a different location. In one embodiment, contour overrides may serve the same purpose as restoration parameters, but are included in contour information instead of being specified in the same manner as restoration parameters. Note that the storage of metadata in the contour or patch and its use during restoration by the client system is optional. In some cases, the client system will not use this metadata if it is available.

Since process 800 may be active on many client systems, the backup service may transmit articles to many systems simultaneously or over time. Since different clients may share article representations on the backup service (i.e. they have articles with identical content identifiers), the backup service may transmit all or a given portion of an article or metadata to multiple clients.

In one embodiment, process 800 uses a minimal transmission restore strategy by restoring a differential contour and transmitting it to a restore device. In this embodiment, large articles are organized into smaller portions for localized patching and splicing restoration. In one embodiment, process 800 performs restoration for a cluster(s) of machines having shared contours. In this embodiment, process 800 is useful to restore articles to machines in the cluster(s) for situations where data may have been lost for multiple machines, a complete network, etc. Examples for this use are catastrophic events (such as tornadoes, earthquakes, fire, etc.), electrical failures, sabotage, etc. In one embodiment, a machine or machines previously considered as a master for other machines in the cluster(s) is restored first. In another embodiment, article restoration is accomplished in order of article availability, the reverse of the order that articles were backed up, user-desired order, ordered by size, ordered by most-recently used, ordered by system or platform dependencies (e.g. required for booting, required for running the application, etc), etc. In another embodiment, restore process 800 may restore contours to completely new machines that are compatible with the backed up contours (e.g., when machines are upgraded, etc.). In yet another embodiment, restore process 800 can simulate clusters when contours are restored to a newly created cluster (of course licensing issues would have to be taken into account). In this embodiment, new offices can easily have machines loaded to replicate older offices.

Process 800 continues with block 860 wherein the client's computer system determines whether the selected articles to be restored were successfully stored (i.e., restored) on the client's computer system. Successful restoration can be verified by means such as signatures (e.g., checksums), error detection mechanisms, etc. If the client's computer system determines that the restoration process has been successful, then the backup service is notified block 865 and the restoration process is then terminated with block 870. If all articles have not been successfully stored, the process continues with block 875 where the remaining unsuccessfully transmitted articles are transmitted. After block 875, block 855 is again entered. In one embodiment, a temporary storage area on the client is used for restoration of articles during a safe, controlled period of time (e.g. during the shutdown process) so as not to cause the system to fail (i.e., "crash"). In this embodiment, the articles are restored when it is safe to do so (e.g., at shutdown, before boot-up, etc.).

In one embodiment, if the client's computer system has a catastrophic event (such as a hard drive failure, main memory failure, etc.), a special loading device (such as a floppy-disk, memory storage module, flash memory card, etc.) containing basic OS articles and restoration process 800 can be used to restore articles to an available storage device.

If block 825 determines that a full restoration of articles is requested, process 800 continues with block 845. In block 845, the client transmits the CCID(s) for the contour selected for restoration to the backup service. In block 850, all the articles included in the selected contour are transmitted from the backup service to the client computer system. Process 800 continues with block 855. Again, if the requested articles are not restored, the process resumes to only request those articles that have not been successfully transferred. Note that process 800 does not include the steps necessary for the backup service to request the contour represented by the CCID(s) transmitted in block 845 if they are not known at the backup service. One skilled in the art will understand the additions necessary to process 800.

In an embodiment, the number of retries to transmit articles to the client or server may be limited or back-off and retry mechanisms may be used to circumvent transient problems, such as, for example, a temporarily noisy communication channel. In an embodiment, the backup and restore processes would ensure that there are sufficient resources on the client before and during the process execution. Such resources might include, for example, battery power reserves or available storage space.

This description of processes 700 and 800 do not account for all necessary recursion when CCID(s) and articles representing contours need to be expanded in order to facilitate the restoration process. One skilled in the art will be able to deduce the necessary additions to processes 700 and 800 to account for this.

One should note that there are many scenarios that can be selected by a client regarding process 700 and process 800, e.g., when to backup, how to connect to the backup service, how to verify the successful backup or restoration of an article, etc. In one embodiment processes may involve recursive operations or extensions, including appropriate exit conditions, in order to handle recursively organized contours, that is, contours containing contours or other hierarchically organized articles.

By using CIs to reference articles, the backup process on a client's computer system can take less time to complete by not having to upload client-invariant information, which includes an article's contents and attributes. One should note that some attributes can be uploaded as an option, such as file size, etc. Only an article's client-specific information (which includes the CI) is necessary to upload as long as an article with the exact same contents is already stored on a backup service's designated storage device. Therefore, with a large pool of client computer systems, a backup service would only need to store a single copy of client-invariant information, as well as client-specific information for the various clients, which backup a given article. Thus, if all clients in a client pool have an article "XYZ," only one copy of the contents of article "XYZ" would need to be stored by the backup service, along with the client-specific information for each client in the pool. This results in minimizing storage space on the backup service's designated storage device. Additionally, this results in a client spending less backup time (due to transferring only client-specific information for articles having the same contents). This is beneficial for the clients since less data needs to be transferred to the backup service's designated storage device. In one embodiment, where only metadata is changed for a particular article, only the changed metadata is transmitted to the backup service from the client's computer system. Therefore, it is not necessary to transfer the article's contents to the backup service. Thus, time and bandwidth are reduced since it is possible to complete entire client computer system backups with very little information exchanged.

In one embodiment, in order to insure backup process integrity, signatures (e.g., checksums) or other error detection information can be computed and exchanged. This information may include: contour type or patch differences exchanged, contour type or patch similarities not exchanged, the full reference contour, full new (current backup) contour types or patches; the backup service reconstructs the contour type or patch from the differences received, etc. The client computer system and the backup service can then exchange this error detection information as a cross-check. This is to ensure that the backup service and the client's computer system are in agreement and that no corruption has occurred (e.g., malicious attempts to modify or thwart the backup process, communication errors, etc.). One should note that the differential backup process is resilient to metadata attacks that might try to inhibit proper backup procedures. For example, a malicious process could toggle archive bits or timestamps to prevent the backup system from saving certain articles or detecting changes to those articles. A failing storage device could exhibit similar behavior. Because Content Identifiers are derived from the article contents, it is significantly more difficult to hide article changes.

In one embodiment, signature (e.g., cryptographic hash or checksum) fields may be transferred between client and server during backup or restore. The signature fields can be implemented in specific fields, across all fields, or in a subset of fields being transferred between the client and server. In one embodiment, signature fields are included within the Client-Invariant Content Descriptors (illustrated in FIG. 3). Another embodiment includes signature fields within Client-Specific Article Descriptors (illustrated in FIG. 2).

In one embodiment, contours or patches are permitted to be stored on both the client computer system and the backup service's designated storage device in expanded or differential forms. In one embodiment, the copies stored on the client's computer system are used for improving backup service efficiency. If a contour or patch copy is lost or damaged, master contours that are specific to the client can be retrieved from the backup service. Signature checksums can be used to verify integrity, for example. In addition, portions of contours or patches may be transferred between client and server. For example, a subset of the full contour or patch contents may be transferred from server to client if the client wishes to restore only a portion of the contour or patch (e.g. the client had backed up multiple hard drives to the server, but now wishes to restore only files from a single drive). This transfer of portions of contours or patches further optimizes the communication mechanism. When reference is made to a portion of a contour or patch, this may refer to the whole contour or patch or to a proper subset of the contour or patch.

In one embodiment, when an article is added to the client's computer system, the full set of client-specific information is transmitted to the backup service for the added article. If an article's content already resides on the backup service's designated storage device (in client-invariant storage, which includes the article's contents), the client-invariant information is not transmitted. Otherwise, the client-invariant information, which includes the article contents, is transmitted. Regardless, the client-specific information is added to the contour or patch.

In one embodiment, an optimization can be made in the case where an article is deleted and expanded contours are stored, but differential contours are used to minimize bandwidth between the client system and backup service. When the differential contour is transferred, the reference contour is expanded, if necessary (by de-referencing any chained differential contour representations), essentially copied and the entry corresponding (based on the unique content identification) to the deleted article is removed. If all reference contours are expanded contours this operation is very fast.

In one embodiment, when an article's client-specific information is modified, only an article identifier is transmitted (e.g., CI or an equivalent) along with the associated fields that have changed and their associated information.

In one embodiment, differential contours are transmitted to the backup service, which then expands the backup articles through chaining. In this embodiment, the differential contour, expanded contour, or subset can be stored by the backup service. In one embodiment, the client's computer system can transmit expanded contours and the backup service can compute differential contours from the expanded contour. One should note that expansion and differential processes can occur on either the client's computer system, by the backup service, or in any combination.

Figure 9:
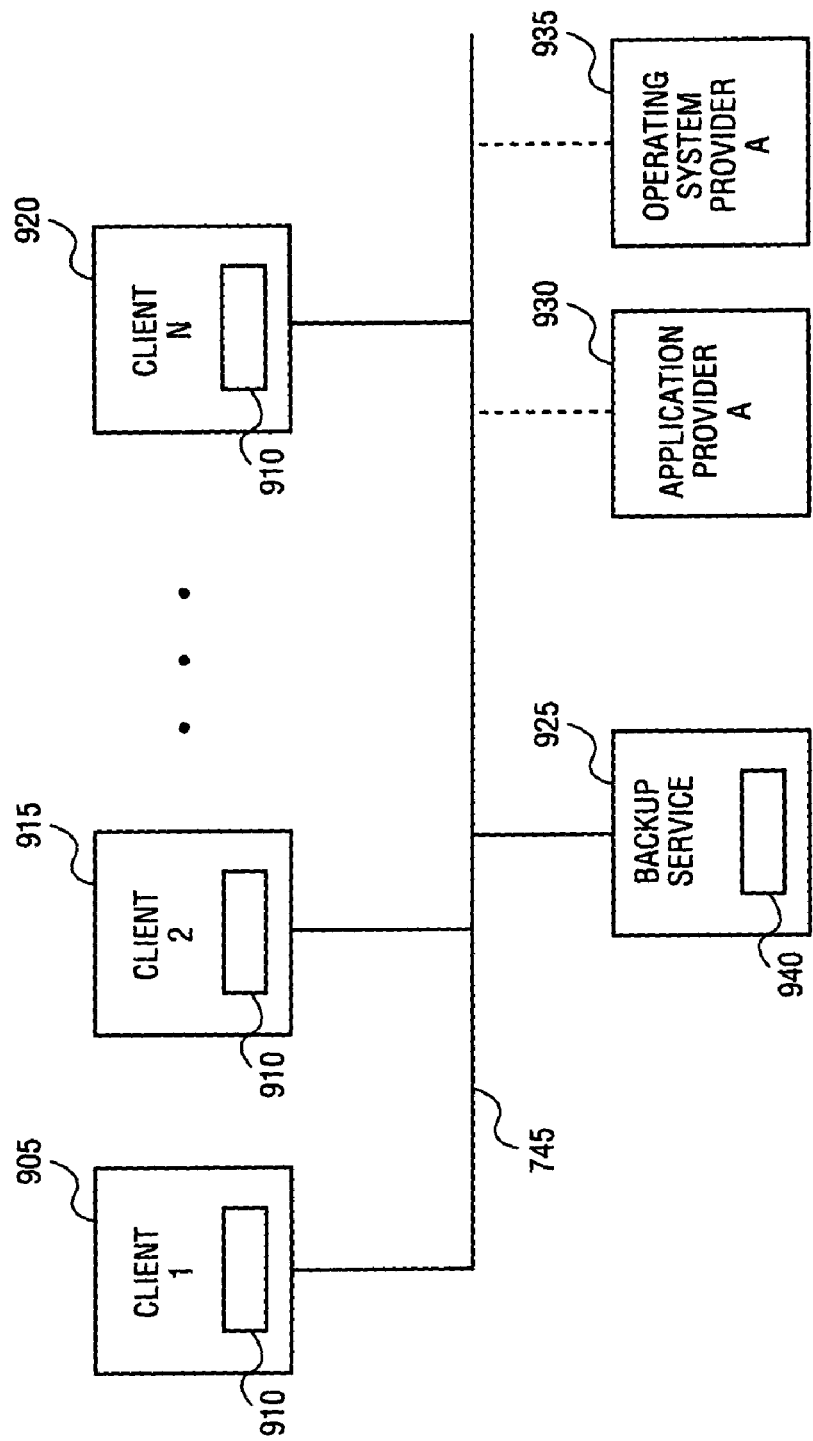
FIG. 9 illustrates an embodiment wherein multiple clients can connect with a backup service system.

FIG. 9 illustrates an embodiment wherein multiple clients/hosts can be coupled with a backup process. As illustrated in FIG. 9, client/host 1 905, client/host 2 915 through client/host N 920 can connect to a backup service 925 running on another client/host via a transmission medium 945. One should note that transmission medium 945 can be any transmission medium, including the dialup modem, Internet, intranets, local-area networks, wireless communication networks, intra-system (e.g. dedicated wire link or bus), etc. Each client can perform a backup service for itself or any other client(s) if connected with each other. Backup service 925 can be embedded in software that is installed on each individual client/host, a temporary process running on the client's/host's computer system, a virtual machine, a virtual machine monitor, a BIOS, a management host or management partition, a chipset, microprocessor, or special instruction set architecture extensions for computing unique file identifiers and running backup/restoration processes on the individual client's/host's computer system, etc. Thus, in some instances, the client's computer system need not have backup service 925 installed in any fashion on the client's computer system. One should note that various processes performed by the backup service 925 may be split across multiple devices, sources, clients/hosts, etc.

Also coupled with one or more hosts/clients is a storage device 910. Storage device 910 can be any device capable of storing information either permanently or temporarily. Articles to be backed up/restored may reside on any storage device coupled to any client/host. Each client/host can be coupled with each other's storage device, any combination of storage devices, or only its own storage device. One should note that storage devices 910 coupled to each client need not be the same type of device (e.g., storage device 910 coupled to client 1 905 may be a cache memory, storage device 910 coupled to client 2 915 may be a tape drive, and storage device 910 coupled to client N 920 may be a re-writeable compact disc (CDRW) drive).

Backup service 925 is coupled with storage device 940. Storage device 940 can be coupled similarly to storage device 910 (with reference to client computer systems). In one embodiment various application providers, such as application provider/vendor A 930, and various operating system providers, such as operating system provider/vendor A 935, can also be coupled with backup service 925. By having application providers and operating system providers coupled with backup service 925, reference contours can be transmitted either to backup service 925 or directly to clients coupled to backup service 925.

In an alternative embodiment, the backup service and client may both be resident on a single device (implementing the backup and restore processes). In this embodiment, the service's designated storage device may be directly tethered to the client system or it may be remote. For example, the backup service may access a tape drive attached directly to the device.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nano-technology devices, organic, holographic, solid-state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   determining contour requirements from a plurality of factors; and
   based on the contour requirements, one of:
   generating at least one standard content-derived signature contour from at least one of a content identifier and a second content-derived signature contour, and
   generating at least one optimized content-derived signature contour from contour-related data and at least one content-derived signature contour.

2. The method of claim 1, wherein the at least one content-derived signature contour is expanded.

3. The method of claim 2, wherein the expanded at least one content-derived signature contour is derived from a recursively determined content identifier tree.

4. The method of claim 1, wherein the at least one optimized content-derived signature contour is derived from at least one of:
   a differential contour derived from a content-derived signature contour and at least a portion of differential data,
   a content-derived signature contour and at least a portion of a contour patch,
   a content-derived signature contour and at least a portion of a contour override,
   a content-derived signature contour and at least a portion of a transform contour,
   a content-derived signature contour and at least a portion content access metadata,
   a content-derived signature contour and at least a portion of content access metadata, and
   a content-derived signature contour modified to optimize one of size and contents to one of decrease bandwidth and increase redundancy.

5. The method of claim 1, the at least one optimized content-derived signature contour is a restoration contour, wherein the restoration contour includes at least one of metadata, a content identifier, a local media descriptor, and a contour patch.

6. The method of claim 1, the at least one optimized content-derived signature contour is a factored contour, wherein the factored contour includes at least a single metadata object that represents metadata for a plurality of articles.

7. The method of claim 1, wherein the contour requirements include:

at least one of computational complexity, storage capacity, cost, communication bandwidth, communication latency, and contents of reference contours.

8. A method comprising:

requesting one of at least one content-derived signature contour and at least one optimized content-derived signature contour, the content-derived signature contour including one of a plurality of content identifiers and at least one content-derived signature contour, and the optimized content-derived signature contour is derived from contour-related data and one of the at least one content-derived signature contour and a derivation from the at least one content-derived signature contour;

determining if one of the at least one content-derived signature contour and the at least one optimized content-derived signature contour is present on at least one device;

dynamically creating one of the at least one content-derived signature contour and the at least one optimized content-derived signature contour if it is determined that one of the at least one content-derived signature contour and the at least one optimized content-derived signature contour is not present on the at least one device, returning one of the at least one content-derived signature contour and the at least one optimized content-derived signature contour if one of the at least one content-derived signature contour and the at least one optimized content-derived signature contour is determined to be present on the at least one device; and transmitting client contour identifications (CCIDs).

9. The method of claim 8, wherein a plurality of representations of one of the at least one content-derived signature contour and the at least one optimized content-derived signature contour are returned.

10. The method of claim 8, wherein the at least one content-derived signature contour and the at least one optimized content-derived signature contour is originally stored on one of the at least one device and a source device, wherein the source device is one of local and remote to the at least one device.

11. An apparatus comprising a machine-readable medium containing instructions which, when executed by a machine, cause the machine to perform operations comprising:

determining contour requirements from a plurality of factors, based on the plurality of factors, one of:

generating at least one content-derived signature contour from one of a plurality of content identifiers and at least one content-derived signature contour, and generating at least one optimized content-derived signature contour from contour-related data and one of said at least one content-derived signature contour and a derivation from said at least one content-derived signature contour.

12. The apparatus of claim 11, wherein the at least one content-derived signature contour is expanded.

13. The apparatus of claim 11, wherein the expanded at least one content-derived signature contour is derived from a recursively determined identifier tree.

14. The apparatus of claim 11, wherein the at least one optimized content-derived signature contour includes at least one of:

a differential contour derived from a content-derived signature contour and at least a portion of differential contour data, a content-derived signature contour and at least a portion of a contour patch, a content-derived signature contour and at least a portion of a contour override, a content-derived signature contour and at least a portion of a transform contour, a content-derived signature contour and at least a portion content access metadata.

15. The apparatus of claim 11, the at least one optimized content-derived signature contour is a restoration contour, wherein the restoration contour includes at least one of metadata, content identifiers, a local media descriptor, and at least one contour patch.

16. The apparatus of claim 11, the at least one optimized content-derived signature contour is a factored contour, wherein the factored contour includes at least a single metadata object that represents metadata for a plurality of articles.

17. The apparatus of claim 11, wherein at least one content-derived signature contour and the at least one optimized content-derived signature contour reside on one of at least two separate devices and one device.

18. The apparatus of claim 11, wherein at least one content-derived signature contour and the at least one optimized content-derived signature contour are stored on one of the at least one device and a source device, wherein the source device is one of local and remote to the at least one device.

19. The apparatus of claim 11, wherein the at least one content-derived signature contour and the at least one optimized content-derived signature contour are originally stored on one of the at least one device and a source device, wherein the source device is one of local and remote to the at least one device.

20. An apparatus comprising a machine-readable medium containing instructions which, when executed by a machine, cause the machine to perform operations comprising:

requesting one of at least one content-derived signature contour and at least one optimized content-derived signature contour, the content-derived signature contour including one of a plurality of content identifiers and at least one content-derived signature contour, and the optimized content-derived signature contour is derived from contour-related data and one of the at least one content-derived signature contour and a derivation from the at least one content-derived signature contour;

determining if one of the at least one content-derived signature contour and the at least one optimized content-derived signature contour is present on at least one device, dynamically creating one of the at least one content-derived signature contour and the at least one optimized content-derived signature contour if it is determined that one of the at least one content-derived signature contour and the at least one optimized content-derived signature contour is not present on the at least one device, and returning one of the at least one content-derived signature contour and the at least one optimized content-derived signature contour if one of the at least one content-derived signature contour and the at least one optimized content-derived signature contour is determined to be present on the at least one device.

21. The apparatus of claim 20, wherein a plurality of representations of one of the at least one content-derived signature contour and the at least one optimized content-derived signature contour are returned.

22. The apparatus of claim 20, wherein the at least one content-derived signature contour and the at least one optimized content-derived signature contour is originally stored on one of the at least one device and a source device, wherein the source device is one of local and remote to the at least one device.

23. A system comprising:
a plurality of devices coupled to a transmission medium, each of the plurality of devices coupled with a first process and a second process and having one of at least one content-derived signature contour and the at least one optimized content-derived signature contour,
wherein the first process:
determines contour requirements from a plurality of factors,
based on the plurality of factors, one of:
generates at least one content-derived signature contour from one of a plurality of content identifiers and at least one content-derived signature contour, and
generates at least one optimized content-derived signature contour from contour-related data and one of said at least one content-derived signature contour and a derivation from said at least one content-derived signature contour; and
stores one of the at least one content-derived signature contour and the at least one optimized content-derived signature contour, and
wherein the second process:
requests one of the at least one content-derived signature contour and the at least one optimized content-derived signature contour, the content-derived signature contour including one of a plurality of content identifiers and at least one content-derived signature contour, and the optimized content-derived signature contour is derived from contour-related data and one of the at least one content-derived signature contour and a derivation from the at least one content-derived signature contour;
determines if one of the at least one content-derived signature contour and the at least one optimized content-derived signature contour is present on at least one device,
dynamically creating one of the at least one content-derived signature contour and the at least one optimized content-derived signature contour if it is determined that one of the at least one content-derived signature contour and the at least one optimized content-derived signature contour is not present on the at least one device returns one of the at least one content-derived signature contour and the at least one optimized content-derived signature contour.

24. The system of claim 23, wherein the at least one content-derived signature contour is expanded.

25. The system of claim 23, wherein the expanded at least one content-derived signature contour is derived from a recursively determined content identifier tree.

26. The system of claim 23, wherein the at least one optimized content-derived signature contour includes at least one of:
a differential contour derived from a content-derived signature contour and at least a portion of differential contour data,
a content-derived signature contour and at least a portion of a contour patch,
a content-derived signature contour and at least a portion of a contour override,
a content-derived signature contour and at least a portion of a transform contour,
a content-derived signature contour and at least a portion content access metadata.

27. The system of claim 23, the at least one optimized content-derived signature contour is a restoration contour, wherein the restoration contour includes at least one of metadata, content identifiers, a local media descriptor, and at least one contour patch.

28. The system of claim 23, the at least one optimized content-derived signature contour is a factored contour, wherein the factored contour includes at least a single metadata object that represents metadata for a plurality of articles.

29. The system of claim 23, wherein a plurality of representations of one of the at least one content-derived signature contour and the at least one optimized content-derived signature contour are returned.

30. The system of claim 23, wherein the at least one content-derived signature contour and the at least one optimized content-derived signature contour is originally stored on one of the at least one device and a source device, wherein the source device is one of local and remote to the at least one device.

31. The system of claim 23, wherein the factors include: at least one of storage capacity, cost, and throughput.

* * * * *

UNITED STATES PATENT AND TRADEMARK OFFICE
CERTIFICATE OF CORRECTION

PATENT NO. : 7,257,257 B2  Page 1 of 1
APPLICATION NO. : 10/644445
DATED : August 14, 2007
INVENTOR(S) : Anderson et al.

It is certified that error appears in the above-identified patent and that said Letters Patent is hereby corrected as shown below:

In column 8, at line 6, delete "C1" and insert --CI--.

Signed and Sealed this

Twenty Second Day of April, 2008

JON W. DUDAS
*Director of the United States Patent and Trademark Office*